Feb. 22, 1955 L. F. DYER 2,702,499
JUSTIFYING TYPED LINE
Filed June 3, 1950 2 Sheets-Sheet 1

Leroy F. Dyer
INVENTOR.

Feb. 22, 1955 L. F. DYER 2,702,499
JUSTIFYING TYPED LINE
Filed June 3, 1950 2 Sheets-Sheet 2
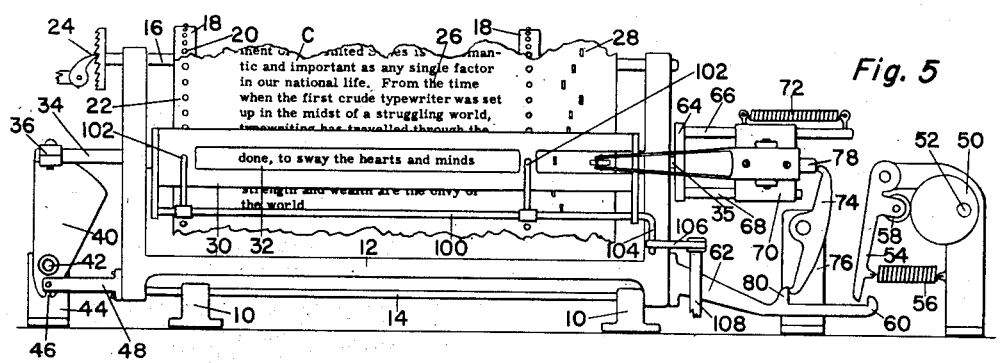
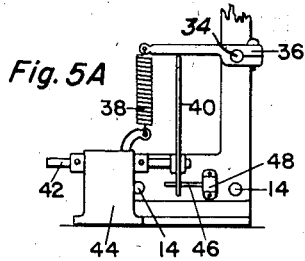
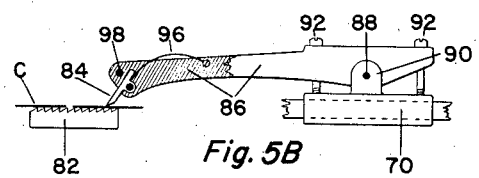
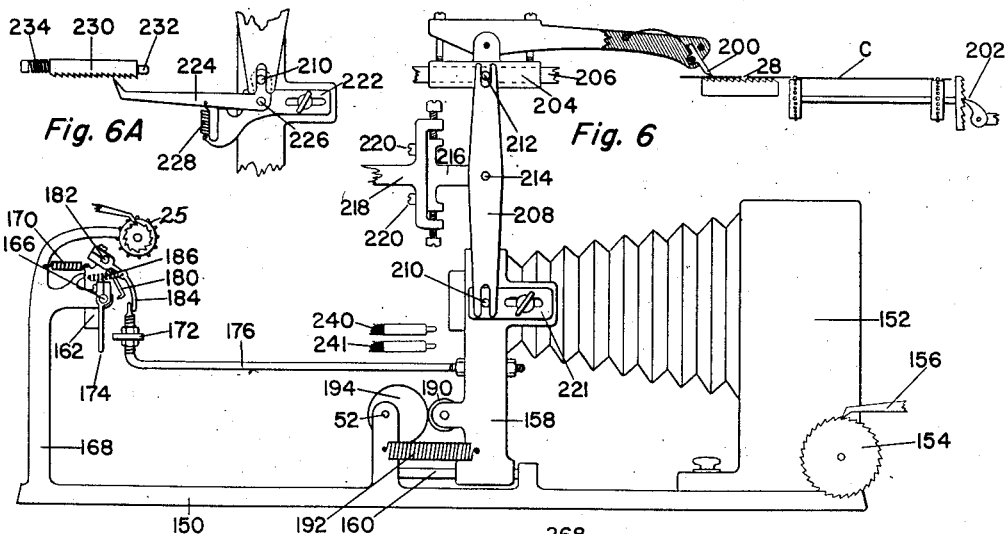
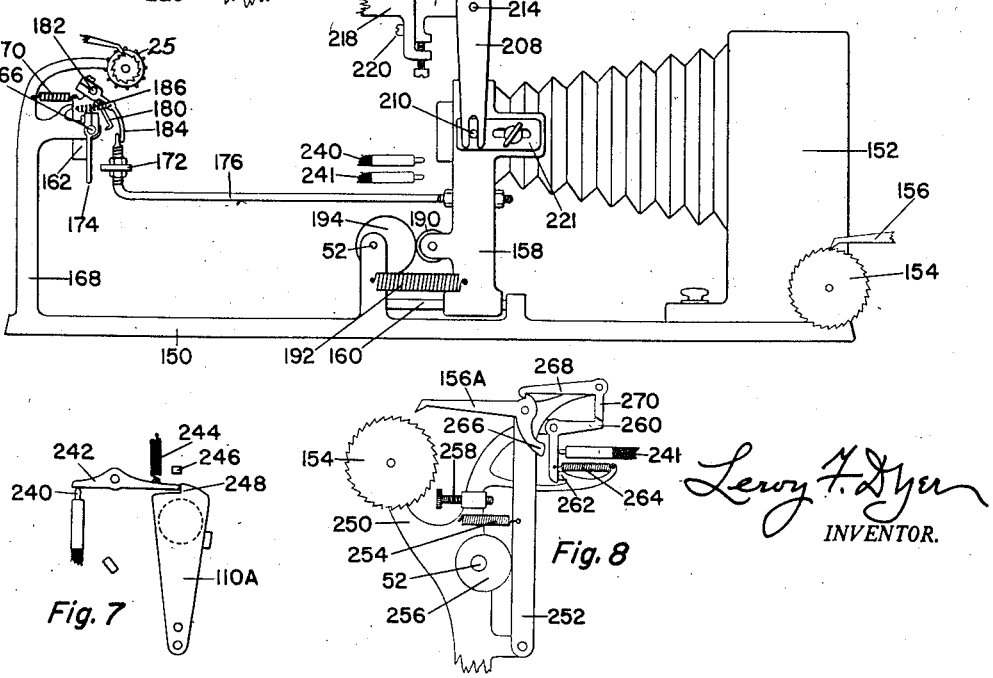
Leroy F. Dyer
INVENTOR.

United States Patent Office 2,702,499
Patented Feb. 22, 1955

2,702,499
JUSTIFYING TYPED LINE

Leroy F. Dyer, Quincy, Mass.

Application June 3, 1950, Serial No. 165,993

11 Claims. (Cl. 95—4.5)

This invention relates to means for automatically justifying lines of print photographically, with particular respect to those methods which employ angular displacement between copy and a sensitized medium, for the purpose of altering the ratio of width to height in the photographic image.

Proofs from type are commonly used in the graphic arts as copy from which printing plates of various kinds are made and there have been many suggestions relating to the use of photography for changing the size or character of the copy. When resorting to typewriters, or similar machines, for the preparation of the typed lines of copy, it is not feasible to make the lines of uniform length, and unless the individual lines of the copy can be altered to justify them, the copy will not be satisfactory for the direct production of printing plates. It will be clear that proposals to overcome this difficulty by camera enlargement or reduction of the length of the lines must anticipate changes in the height of the characters. Attempts have been made to overcome such changes by relative tilting of the copy, for example, with respect to the sensitized material in the camera but these have ignored the consequent distortion of the image noticeable particularly in the normally vertical strokes of the individual letters and have, therefore, been commercially unsatisfactory.

It is an object of my invention to produce prints similar to type proofs, without resorting to type composition, by automatically altering the height and width of unjustified lines of print such as may be produced by a typewriter, photo-composing machine, or other means, so that such lines may be the required size, of uniform length, in alignment at both ends, free from perspective effects on the vertical strokes, and photographically positive.

Other objects are to produce these results at extremely high speed, to produce positives on film for direct use in lithography and other processes, without subsequent camera operations, and to provide a large justification factor, or ratio between the shortest and longest line to be justified.

In one embodiment, the method produces a final print by first forming a distorted optical image of the copy on an image forming element, such image being corrected for height approximately fifty percent and then photographing this image to produce a photographic record which has been completely corrected for height and is undistorted by reason of the fact that the distortion introduced in the first step has been eliminated by equal but opposite distortion in the second step.

I have found that when lines are expanded laterally the letters have the appearance of being larger than those of lines which have not been so expanded. In my method the angle of incline is proportionately varied from that degree necessary to maintain equal height of lines, resulting in a slight decrease in the height of expanded lines beyond that necessary to maintain uniform height (or increase, in the case of contracted lines) between the characters of expanded and unchanged lines. As a result, lines of slightly varying heights appear to be the same height and are, therefore, more pleasing to the eye. The reason for such optical similarity is that uniformity in the area of the space occupied by any given letter in lines oppositely affected is more nearly approached.

My mechanism employs a simple mechanical means of control which consists of a device for punching a hole a uniform distance from the end of each line of copy, as it is typed, and providing upon each camera unit a specially designed pawl, which sweeps across the copy sheet until permitted by the hole to engage a notched bar in such a manner as to stop the movement of interconnected parts. Such holes become code signals which indicate to a sensing device the length of the associated line and hence the correction required.

A novel feature of my invention resides in the incorporation into the positive-making unit of a mechanism which automatically deletes any line in the copy if the control hole has been omitted. This permits the operator who prepares the copy to correct mistakes by simply omitting the control hole after any line in which an error occurs, and re-writing the line. This feature is also valuable when it is found, in typing copy, that a line breaks awkwardly within the limits provided for justification. In such cases the line can be easily deleted and written again with either more or less space between words, as may be required.

Another important aspect of my invention is the employment of the same copy with its controlling holes twice to complete its functions. It is first used to control the operation of the first unit which optically produces an image of the original copy on an image-forming element, such as a sheet of sensitized material. In this unit it functions to center each line, independently of the others, on the axis of the lens, and to control the inclination of either the copy or the sensitized medium from positions parallel to the true focal plane. It will be obvious that, since inclining the sensitized material increases the height of the image while inclining the copy decreases it, if the sensitized material is inclined, the action of travel of the sensing pawl toward the control holes will be to decrease inclination, opposite to the case when the copy is inclined.

In the second, or positive unit, the copy is synchronized with the negative from the first unit which, after automatic processing, is here exposed to sensitized material to produce the final positive print. In this second unit the copy is used to control movement of the camera lens for the purpose of enlarging (or reducing) lines to uniform length, and also to incline either the negative or the sensitized material in a direction opposite to that of the first unit, to neutralize distortion and to complete correction for height.

Another object of the invention is to provide copy-holding means by which typed copy may be properly positioned with respect to the photographic apparatus, line by line.

A feature of my invention is that it includes means for automatically sliding the copy-holding carrier to center the lines. Provision is also made for tilting the carrier, under control of the punched holes which were added when preparing the copy.

Still another feature of the invention lies in the carrier-stopping mechanism which, as illustrated, includes a novel pawl structure operative to pass through a control hole and firmly engage an underlying ratchet, at high speed and without tearing or injuring the paper.

The illustrated mechanism also includes, in accordance with still other features of the invention, devices operative in case of over-travel of the positive-unit control pawl, as when an unwanted line without a control hole is present, to prevent operation of the camera shutter and also of the feeding mechanism which advances the sensitized material.

These and other features and aspects of the invention will now be described in the following specifications, reference being had to the accompanying drawings, in which:

Fig. 5 shows, in elevation, a copy-supporting frame with a tilting device.

Fig. 5A is a fragmentary view taken at the left end of Fig. 5.

Fig. 5B shows the sensitive pawl which finds the punched holes.

Fig. 6 is a diagram, in elevation, of the positive unit.

Fig. 6A is a fragmentary view showing a device for stopping movement of the lens-adjusting lever.

Fig. 7 shows a locking device for the shutter.

Fig. 8 illustrates a material-feeding device.

Figure 1:
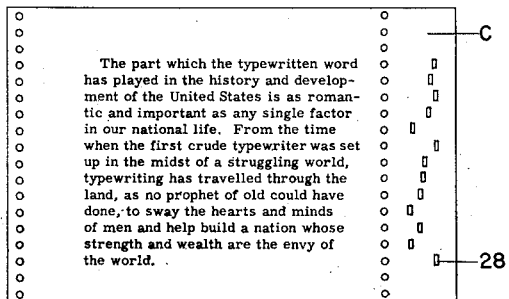
Fig. 1 shows a piece of copy written on perforated paper and having a margin punched to signal the length of the line.
Figure 2A:
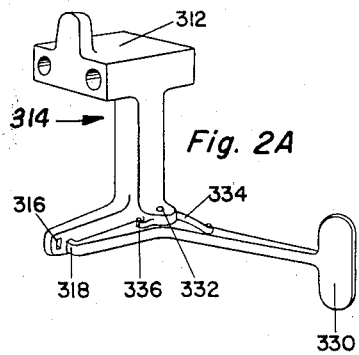
Fig. 2A is an angular view of the punching device.
Figure 2:
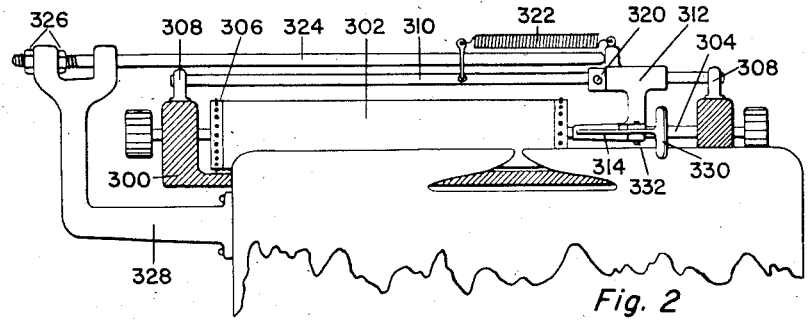
Fig. 2 shows a typing machine provided with a punching apparatus.

According to the method herein illustrated, copy is first prepared, as upon a typewriter, and, for the sake of accurate handling of the copy sheet, the paper upon which copy C is written is pre-perforated with one or more vertical rows of perforations 22 up and down the sides of the paper, the perforated holes being a distance apart corresponding to the line spacing of the typewriter. A space is provided at the right of the paper, beyond the perforations, for punching control holes 28 by means of a manually operated punch attached to a typewriter having a carriage 300 and a platen roll 302. A portion of the platen roll has been cut away at the right hand end, leaving only a supporting shaft 304. At either end of the platen roll is a studded wheel 306 having nubs to engage the perforations 22 of the copy paper and thus cause each line to be accurately positioned with respect to the perforations.

Supports 308 are attached to the carriage and between them is shown the front one of two parallel rods 310 supporting a sliding member 312 to which is attached a signal-forming device 314 so constructed that a die 316 is behind the paper while a punch 318 is at the front, the paper extending into the throat between the two.

A stop 320, limiting the left-hand movement of sliding member 312 is secured to one of the rods 310 while a spring 322 between the sliding member and a clip on one rod 310 normally holds such sliding member against said stop.

A stop-rod 324, adjustable by means of nuts 326 is supported by a bracket 328 on the typewriter bar. This rod 324 is so adjusted that it engages sliding member 312 at that point in the travel of the carriage toward the left where the last character of the shortest line, within the limits provided for justification, has been reached. From this point on, in the travel of the carriage toward the left, sliding member 312 which supports the punch assembly, will remain stationary with respect to the typewriter frame, being restrained from further movement by rod 324. Consequently, for any number of units of space which the carriage continues to move toward the left, the punch will be positioned a corresponding number of units beyond the last type character written, and therefore when any line is completed and the punch is operated, at any point within the range allowed for justification, by forcing fingerpiece 330 to the left, a control hole 28 will be punched at a distance from the last character of the line equal to that of all other lines similarly punched. In any case where a line is completed before the justifying zone has been reached, as at the end of a paragraph, the operator must space out the line or move the carriage to where the punch is within the justifying zone.

The punch 318 with its operating lever and fingerpiece 330 are mounted on a pin 332, a spring 334 being arranged to hold the punch in open position against a limiting stop 336.

It is then desired to prepare, photographically, from this typed copy, a negative, each line of which shall be centered to facilitate the action of the positive unit. At the same time provision is made for reducing, by approximately half the amount ultimately desired, the proportional height of the typed line so that the appearance of the final justified positive line will be substantially like that of the original copy. It is to be understood that any enlarging camera with a spherical lens will, unless some contrary provision is made, necessarily enlarge the letters heightwise at the same time it is enlarging the line lengthwise. This difficulty is avoided, in my method, by providing a relative tilting movement between the copy and the sensitized material in the camera. For convenience, the apparatus shown is made so that the copy itself is tilted to carry the top of the copy away from the camera. It is, however, tilted only enough to compensate partly for the increased height which would otherwise result, and at a subsequent stage, a reverse tilting is provided which completes the heightwise adjustment and removes the distortion introduced at the time the negative is made. This sensitive material in the negative camera is then developed and dried so that it may be used as an object to be photographed in the production of a positive for direct reproduction in printing processes.

The arrangement of the positive unit is such that the same original copy is used to regulate the adjustment of the camera and the tilting of the negative copy by means of which the heightwise distortion of the letters is eliminated. In this positive unit a sheet or roll of sensitized material is fed, automatically, through the camera to a developing unit and from this unit the positive is removed and dried and the perforated margins trimmed. It has been stated before that the second tilting operation is in a reverse direction to that which took place when the negative copy was being made. This completes the reduction of height of the line to the extent desired and, because of the reverse tilting, the distortion of the letters which was introduced at the time of making the negative copy is eliminated.

Figure 3:
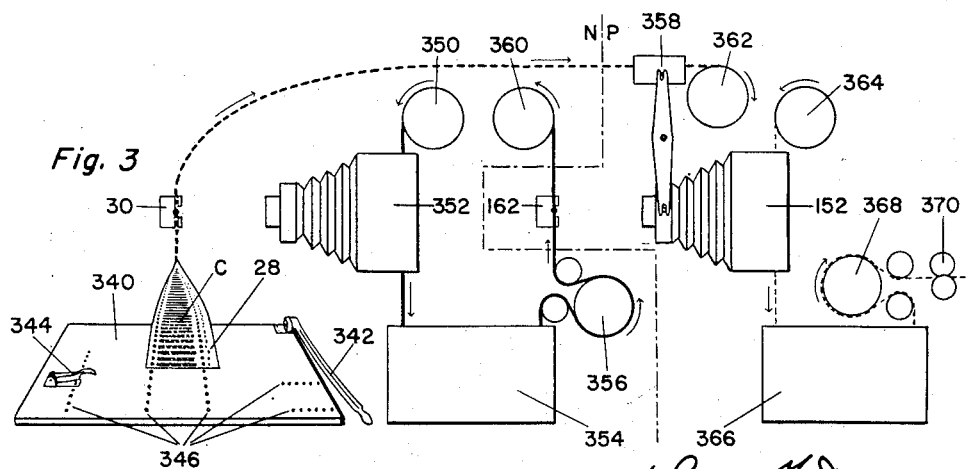
Fig. 3 is a diagram showing progress of the work through the various units of the apparatus.

Fig. 3 is a diagram illustrating the manner in which copy and sensitized materials proceed through the various units but does not, necessarily, indicate the position of such units with respect to each other. In this diagram a heavy dotted line denotes copy; a heavy solid line, negative material; a light dotted line, positive material. A line NP separates the components on the left, which comprise the negative-making unit, from those on the right of the line, which comprise the positive-making unit.

To aid in assembling successive sheets or rolls of copy a copy-assembling table 340 may be used. This is provided with a trimmer 342, a punch 344, and positioning pins 346. 30 is the copy-tilting and centering device of the negative-making unit, which is controlled by the signal holes 28 in the copy C. In this unit, lines of copy are successively centered and exposed to negative material from magazine 350, in camera 352, which negative material, after exposure, is then passed through the processing compartment 354, around drying drum 356, to negative-holder 162. At this point copy proceeding from tilting-frame 30 is passed through control-unit 358 of positive-making camera 152. In practice, both the copy and negative are threaded through their respective units 358 and 162 two or three spaces ahead of the first line on each, while the positive camera is inoperative, having been disconnected by means of a clutch. The clutch is then engaged to cause both units to run in unison, with the copy and negative so synchronized that at the precise moment when a given line on the negative reaches its position in negative-holder 162, in front of the lens of the positive camera, the corresponding line of the original copy will be in position in positive-camera control-unit 358 which acts to adjust the positive camera for the correct length of this particular line.

With both cameras in operation, the negative proceeds from holder 162 to negative re-wind spool 360 while copy from frame 30 passing through positive-camera control-unit 358 is re-wound on spool 362, and sensitized material from positive-camera magazine 364, after passing through positive-camera 152, proceeds to processing-compartment 366, around drying-drum 368, and thence to rotary knives 370 which remove the perforated margins.

Negative-camera 352 and positive-camera 152 are each provided with a shutter which operates in timed relationship with the operating cycle of the machine, to expose sensitized material to the illuminated contents of their respective copy- and negative-holding frames 30 and 162 during the interval while same are in photographing position. Duration of exposure is adjustable without interfering with the operation of the machine.

Figure 4:
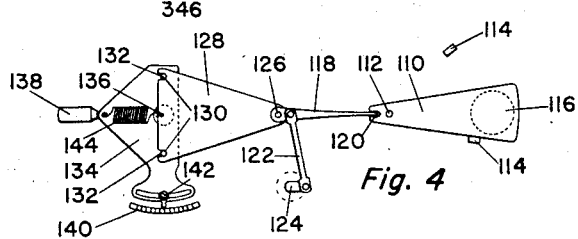
Fig. 4 is an elevation of a camera shutter.

One suitable construction for a camera shutter is shown by Fig. 4 and comprises a shutter vane 110, pivoted at 112, and movable between stops 114 to cover aperture 116 when it is at one end of its movement. The operation of this shutter is effected by a lever 118, the outer end of which enters a slot 120 in the shutter adjacent to the pivot 112. This lever is actuated by a link 122 connected to crank 124 on a motor-operated shaft. In order to make the shutter action adjustable, the lever 118 is pivoted at 126 upon a plate 128 which is provided with notches 130 engaging pins 132 in a support 134 mounted on a pivot 136 and swingable about this pivot by a handle 138 to an extent indicated by the scale 140. When it has been set in an adjusted position it may be held there by a lock-screw 142. The triangular plate 128 is urged against the pins 132 by a tension spring 144. In operation, plate 128 rocks on the pins, due to the action of link 122 and crank 124, shutter-vane movement occurring at the moment when pressure is transferred from either of the pins to the other.

One arrangement by means of which the original copy may be handled and automatically positioned in the negative unit is shown in Fig. 5, where various parts are mounted upon a base or frame (not shown) and these include two guides 10 supporting a slidably-mounted sub-frame 12 including two rods 14 which travel in the perforated guides 10. At the top of this sub-frame 12 is a copy-handling mechanism comprising a shaft 16 on which are mounted rolls 18 provided with a series of nubs 20 which are received in the perforations 22 of the original copy C. The rotation of this shaft 16 may be effected by a pawl-and-ratchet mechanism 24 of a sort common in typewriters. It will be recognized that the typed material 26 on the copy C has lines of irregular length alined at their beginning ends and that the corresponding punch holes in the margin of the copy are positioned at such a distance from the right-hand edge that they indicate the length of the line, and, therefore, the amount which the line must be stretched in order to justify it.

In this unit the copy travels through a tilting frame 30, slotted at 32 to bring a single line to position in front of the camera, the latter having a mask in front of the paper in the camera so that only one line will be photographed at a time. This tilting frame is mounted upon shafts 34 and 35 which are journalled in side members of the sub-frame 12. The shaft 34 at the left has an arm 36 which is provided with a spring 38 (Fig. 5A) to hold it down against the upper edge of a frame-tilting cam 40 which is carried by a short shaft 42 supported in a block 44, also mounted on the base. The lower end of this cam 40 is slotted to receive a pin 46, carried by an arm 48, which is secured to the left side of the sub-frame 12 and the cam is designed to provide a varying degree of copy tilt in order that lines requiring lengthening, for justification purposes, may be reduced in height proportionately to the degree of lengthening necessary and slightly more than the amount required to maintain uniform height. The object of this is to reduce the height of lines requiring considerable lengthening a greater proportion of their original height than lines requiring little or no lengthening, to the end that, in the final justified positive, the areas of individual type characters dissimiliarly affected, may have more nearly equal areas, rather than equal height, thus minimizing the effect of expanding various lines in different degrees and securing an optical similarity. The degree of tilting of the tilting-frame 30, therefore, depends upon the extent of sliding movement of the sub-frame 12. This sliding movement is caused by a cam 50 which is secured to a cam-shaft 52, rotatable in the frame of the machine and driven by an electric motor (not shown) which also operates all the other moving parts of the machine. Associated with the cam 50 is a cam-lever 54, drawn by a spring 56, to the right, and having a cam-roller 58. The lower end of this cam lever is positioned to engage a hook 60 upon the end of an arm 62 which is secured to the right side of the sub-frame 12.

The shaft 35, at the right of the tilting frame is, like the shaft 34, so positioned that its axis is exactly in the plane of the outer surface of the copy C. On the shaft 35 is a plate 64 carrying rods 66 and 68 on which there is slidable a pawl-carrying block 70. This block is drawn to the right by means of a spring 72 secured to the end of rod 66 and is pushed in the other direction, against the tension of this spring, by means of a lever 74 which rocks upon a bearing block 76, also attached to the base. The lever 74, at its upper end, engages a projection 78 upon the block 70. At its lower end it engages lug 80 extending upward from the bracket-arm 62.

The tilting-frame 30 is provided, beneath the copy, with a ratchet block 82 (Fig. 5B) and a specially-constructed pawl, about to be described, is pushed through one of the punch holes 28 to engage the teeth of the ratchet-block 82 to stop the movement of the sub-base and hence of the copy. The sensitive pawl 84 is pivoted between two fingers 86 (one of which is shown cut away) and these fingers are supported by pivot-pin 88 in lugs 90 on the sliding block 70 in such a manner that they may be rocked upon the pivot-pin 88 by adjusting-screws 92 to adjust fingers 86 so that the pawl 84, when resting on copy C, is in such a position that its heel is slightly removed from limiting-pin 98 against which it is constantly urged by a light spring 96.

The action is such that as the sub-frame 12 is drawn to the right the pawl 84 moves to the left, riding lightly upon the surface of the paper, until it slips into one of the holes 28 and engages a tooth of the ratchet-block 82. The pawl then tilts slightly upon its pivot until its heel strikes the limiting-pin 98, whereupon its firmly engages the ratchet block and stops the aforesaid movement. At this time, because of the equal and opposite movements of the sliding pawl support 70 and the sliding copy carrier 12, each line will be centered with respect to the optical axis of the camera 352. This makes it possible for the positive unit camera 152 to stretch the line equally in both directions in order to justify it and thus maintain alignment at either end with other lines similarly treated.

Also pivoted upon the tilting-frame 30 is a rock-shaft 100 which has bent positioning fingers 102 arranged to drop into corresponding perforations 22 in the copy strip as the latter comes into alignment with the slot 32 of the tilting frame.

The ends of these fingers are tapered so that they are able to adjust, slightly, the position of the copy strip to effect its exact alignment. This rock-shaft 100 has a down-turned end 104 positioned, when the sub-frame 12 is at the left as in Fig. 5, to be engaged by a striker-cam 106 upon the upper end of a vertical shaft 108 to cause withdrawal of these fingers 102 immediately before the copy advances and to release the positioning fingers which return, under pressure of a torsion spring (not shown) on the rock shaft, as soon as the copy transfer has been completed.

The conversion of the image with centralized lines which has been produced in the first, or negative, unit to a positive which may be used for direct reproduction in printing is effected by a positive unit shown in Fig. 6. This comprises a base 150, forming part of the frame of the machine, and on this base is mounted a camera 152 through which sensitized material may be drawn by a ratchet 154 operated by a pawl 156 whose travel may be regulated in any suitable manner to control the spacing between the lines. This camera is provided with a lens support 158, slidably mounted on rods, one of which is shown at 160, and the camera is arranged to be focused upon the image, such as the negative copy produced by the negative unit, which, in the illustrated arrangement, is drawn through a tilting frame 162 by a feed-roll 25, operated by a pawl and ratchet. The tilting frame 162 corresponds in construction, generally, to that of the tilting frame shown in Fig. 5, in that it is mounted upon a pivot 166 carried by an upright 168 with the surface of the negative copy in a plane passing through the pivot 166. This tilting frame 162 is constantly urged in a counter-clockwise direction by a spring 170 which holds it in a vertical position against a stop. It may be tilted in a reverse direction by the contact of an adjustable striker-plate 172 with a depending arm 174 clamped on the shaft 166. The striker plate 172 is adjustably positioned upon a rod 176 which is carried by the lens support 158. This unit is also provided with positioning pins 180 which are supported for rotary movement with a pivot-rod 182 and are capable of being retracted by contact of the upper end of the rod 176 with an arm 184 which is clamped to the pivot-rod 182 and which is urged in a clockwise direction by a spring 186.

The lens support 158 is provided with a roller 190 which is held by a spring 192 against a cam-roll 194 on the cam-shaft 52. The extent of movement of lens-support 158 is determined by a pawl 200, constructed like the pawl 84 of Fig. 5B, and adapted to drop into a control hole 28 in the original copy C which is being fed by a mechanism 202 of this positive-control unit in much the same manner as it was fed through the copy frame of the negative unit. The pawl 200 is interconnected with a carrier 204 slidable on rods 206 which are supported by the frame of the machine. The lens-support 158 and the carrier 204 are interconnected by means of a ratio-lever 208, having slotted ends to engage pins 210 and 212 on the lens-support 158 and the carrier 204 respectively. Setting-up adjustments to control the action of this ratio lever 208 are provided by mounting the pivot 214, on which it swings, upon a block 216 which is adjustable heightwise in a frame-supported bracket 218 and is capable of being locked in adjusted position by screws 220. It will be understood that the action of this lens-moving device, in proportion to the length of the original line as determined by the scanning pawl 200, is to justify the line by changing its length. Since the camera 152 has the usual spherical lens, this change takes place in both directions which is permissible since the line of the image in the first unit has already been centered with respect to the optical axis of the first camera 352.

Direct action of the control pawl 200 in stopping movement of the lens support 158 has been found to be effective for a small camera, with a short-focus lens, at speeds up to three lines per second. With larger cameras, having lenses of longer focal length and operating at higher speeds, an auxiliary stopping device such as shown in Fig. 6A may be employed. This is interposed between a pin 211 and a pin 226, adjustably supported by a plate 222 carried in place of the plate 221, on the lens support 158. In this special mechanism the pin 211 is carried on a pawl 224 which is pivoted at 226 on the plate 222 and which is held by a spring 228 against a stop on that plate. This pawl is positioned to engage a ratchet-bar 230, slidable on the frame, and constantly urged against a stop 232 by a buffer-spring 234. The pawl is in disengaged position during forward travel of the lens support until a restraining force is exerted by the lever 208 on the pin 211, whereupon the pawl 224 will immediately engage the ratchet-bar 230 to stop the motion of the lens support, any shock being taken up by the buffer spring 234.

Provision has been made to utilize the over-travel of the lens support 158 (which will occur if no control hole is present) to prevent the shutter from opening and the film-transport mechanism from operating, during the cycle in which such over-travel occurs, by providing a fixedly-mounted "Bowden" wire 240 which extends to a shutter lock shown in Fig. 7, and another "Bowden" wire 241 which extends to a feed mechanism shown in Fig. 8. The shutter lock of Fig. 7 comprises a normally-inoperative stop lever 242, the right end of which is drawn by a spring 244 against a stop 246. In this construction the shutter vane 110A is provided with a notch 248 into which the lever 242 is moved by the action of the wire 240 when the latter is engaged by the lense support 158.

The mechanism for transporting the sensitized material in the positive unit, embodying means for interrupting its action, is shown in Fig. 8, where the ratchet wheel 154 is rotatable upon a frame support 250 which carries a pawl-operating arm 252 urged by a spring 254 against a cam 256 which is mounted on a camshaft 52. This arm 252, at its upper end, supports a pawl 156A which, under control of the cam 256, is drawn ahead by the spring 254 to turn the ratchet-wheel 154 a number of teeth determined by an adjustable stop 258. Studded rollers (not shown) on the shaft of the ratchet-wheel 154 engage the sensitized material in the positive camera and cause it to advance the desired amount.

This arrangement is designed to prevent the pawl 156A from engaging the ratchet 154 (Fig. 6) on the stroke immediately following a signal received through "Bowden" wire 241 that the lens support 158 has over-travelled its normal limit due to omission of the control hole from the copy so that there shall be no feeding of the sensitized material in the positive unit when a line is not to be reproduced.

To this end there is mounted upon the frame 250 a bell-crank lever 260, the lower end of which is normally drawn against a stop 262 on the frame by a spring 264. The pawl 156A is provided with a depending arm 266 which is positioned to be engaged by the lower arm of the bell-crank lever 260 when the latter is pushed forward by the "Bowden" wire. This will disengage the pawl 156A from the ratchet 154 and interrupt the feeding action because the pawl will be latched in an inoperative position by means of a latch 268 carried by the upper end of the pawl-carrying arm 252. The latch has a depending arm 270 which is in position for engagement by the hooked upper end of the bell-crank lever 260 to release it from latched position. Forward motion of the arm 252 causes the latch arm 270 to force the upper arm of the bell-crank 260 downward as it passes over the same, the pawl 156A completing its travel without engaging the ratchet 154. On the return stroke of the arm 252 the hook at the upper end of the bell-crank lever 260 engages the depending end 270 of the latch 268 and disengages it from the pawl 156A, which then returns to operating position against the ratchet 154.

Having thus described my invention what I claim is:

1. In a photographic justifying mechanism, a camera for reproducing lines of copy, a slidable frame for supporting before said camera a sheet of copy having a hole positioned on the copy to provide a signal indicating the length of a line opposite said hole, a ratchet secured to the frame and positioned beneath the hole, a pawl slidably mounted on the frame, said pawl being adapted to co-operate with the ratchet through the hole, and means including a lever interconnecting the two for producing substantially equal and opposite movements of the pawl and the frame until stopped by engagement of the pawl with the ratchet to center the line.

2. In an apparatus as in claim 1, a support for said pawl on which the latter is pivoted at a point between its ends, a light spring engaging said pawl to press it against the copy sheet, and a positive stop on the pawl support for limiting the movement of the pawl after it has dropped through the hole in the copy sheet.

3. In a photographic justifying mechanism, an apparatus for photographically reproducing upon a sheet of sensitized material a copy sheet having a plurality of lines of material and with each line provided with a signal hole spaced at a predetermined distance from the end of an adjacent line of the copy, a slidably mounted holder for the copy sheet, a tiltable holder for one of said sheets, a ratchet fixed on one of said holders beneath said copy sheet, a pawl support independently slidable on the same holder as that on which the ratchet is mounted, a spring urging the pawl toward the ratchet, means for sliding in opposite directions in a predetermined ratio the pawl support and the holder for the copy sheet, and a cam for tilting the tiltable holder to a degree determined by the extent of sliding movement of the holder for the copy sheet.

4. In a photographic justifying mechanism, a camera having a support for copy with a plurality of lines of material and each provided with a signal hole spaced at a predetermined distance from the end of an adjacent line of the copy, a slidably mounted frame, a copy holder tiltable on said frame, a pawl support slidably mounted on said holder to tilt therewith, a pawl on said support urged toward the sheet of copy, a ratchet on the holder beneath the copy, a spring for urging the pawl towards the ratchet, positive means for sliding the frame and the pawl support in opposite directions in a predetermined ratio, and a cam for tilting said holder to a degree determined by the extent of sliding movement of said frame.

5. In a photographic justifying mechanism, a support for copy having a series of lines of material and having a signal hole opposite each line of the copy at a predetermined distance from the end of the line, a ratchet on the support beneath the copy sheet, a slidably mounted pawl support, a pawl on said support arranged to drop through said hole in the sheet and engage said ratchet, a camera having a movable lens, a slidable member for adjusting the position of the lens between an object and sensitized material within the camera, a frame for supporting the object, a pivoted lever interposed between said slidable pawl carrier and said slidable member, said lever having slotted ends to engage the carrier and the slidable lens-adjusting member respectively, and means for adjusting the position of the pivot for said lever.

6. In a photographic justifying mechanism as in claim 5, said object-supporting frame being tiltable and means for interconnecting the lens-adjusting member with the object supporting frame to tilt said frame an amount dependent upon the extent of movement of the lens-adjusting member.

7. An apparatus for automatically producing a justified positive image from unjustified copy, such as lines of type characters, having code signals indicating the length of each line, said apparatus comprising means for causing a relative angular displacement, from a reference plane between the copy and a sheet of sensitized material, means for sensing the position of a code signal and controlling the displacing means accordingly thereby to effect a displacement to an extent determined by the corresponding signal, means for producing on the sensitized material, line by line, a centralized negative photographic image of the copy, somewhat distorted heightwise, means for again causing a relative angular displacement, but in the reverse sense, between another sensitized sheet and the negative image, and means for producing a positive photographic image of adjusted size, line by line on the second sheet to get a justified, undistorted positive image of the successive lines.

8. In a photographic justifying mechanism, a camera having a shutter and a lens for photographically reproducing an image, and at the same time varying the size of the reproduction, a slidable support for the lens of the camera, a cam for moving said support in one direction, a spring to move the support in the other direction, means responsive to a signal on a piece of copy for stopping the spring-produced movement, at a proportionate extent which will produce the desired change in size, and a device operated by overtravel of the lens support in the absence of a signal, purposely omitted, to prevent operation of the shutter when the image is not to be reproduced.

9. An apparatus for automatically producing a justified positive image from a sheet of unjustified copy, such as lines of type characters, comprising mechanism for causing a relative angular displacement, from a reference plane, between the sheet of copy and a sheet of sensitized material, means responsive to the length of the line to be justified for controlling said mechanism and the extent of said relative angular displacement, a camera for producing on the sensitized material a negative photographic image of the line of copy distorted heightwise, means operative automatically for causing relative lateral shifting of said sheets to the extent necessary to center the image on the sensitized material, mechanism for causing a relative angular displacement in a reverse sense between said negative image and a second sensitized sheet, a second camera for producing a positive photographic image on the second sensitized sheet, and means responsive to the length of the line on the unjustified copy for adjusting said camera and said last-named mechanism to obtain a justified undistorted positive image of the successive lines.

10. In a photographic justifying mechanism, a camera having adjustable means, for photographically reproducing upon a sheet of sensitized material an image derived from a sheet of copy having lines of type characters usually having code signals thereon indicating the lengths of the respective lines, a signal-scanning device controlling the extent of movement of the adjustable means in the camera to determine a characteristic, such as the width, of the reproduced image, means including a ratchet and a pawl for transporting said sheet of sensitized material to enable successive lines to be reproduced, a spring for operating the pawl to move the ratchet, a power-operated means for tensioning said spring, means connected to said scanning device and rendered effective whenever there is no signal because it was purposely omitted, opposite a line of undesired matter on the copy, to render said sheet-transporting pawl inoperative whereby such a line may be skipped without leaving an unused, empty, line space on the sensitized material.

11. In a photographic justifying mechanism, a camera for reproducing lines of copy from a sheet having lines of different length and code signals positioned according to the lengths of the lines, upon a sheet of sensitized material, a holder for the sheet of copy, a holder for the sheet of sensitized material, at least one of said holders being tiltably mounted on said mechanism, a power-energized device to tilt said holder, and means operative in response to the position of the code signal in a line for controlling the degree of tilting effected by said device thereby to control the height of the characters in the reproduced line.

References Cited in the file of this patent

UNITED STATES PATENTS

| Number | Name | Date |
|---|---|---|
| 791,062 | Wetmore | May 30, 1905 |
| 1,126,618 | Cornwall | Jan. 26, 1915 |
| 1,192,747 | Brunn | July 25, 1916 |
| 1,457,853 | O'Bryan et al. | June 5, 1923 |
| 1,693,796 | O'Bryan et al. | Dec. 4, 1928 |
| 1,808,320 | Schafer | June 2, 1931 |
| 2,036,000 | Uher | Mar. 31, 1936 |
| 2,084,450 | Paris | June 22, 1937 |
| 2,098,928 | Wenczler | Nov. 9, 1937 |
| 2,160,277 | Neidich | May 30, 1939 |
| 2,356,620 | Schade | Aug. 22, 1944 |
| 2,369,980 | Reyniers | Feb. 20, 1945 |
| 2,377,514 | Pickett | June 5, 1945 |
| 2,377,801 | Mills et al. | June 5, 1945 |
| 2,462,150 | Wilkinson | Feb. 22, 1949 |
| 2,478,314 | Petty | Aug. 9, 1949 |
| 2,607,268 | Bartz | Aug. 19, 1952 |